US008049595B2

(12) United States Patent
Olson et al.

(10) Patent No.: US 8,049,595 B2
(45) Date of Patent: Nov. 1, 2011

(54) SYSTEM AND METHOD FOR WIRELESS CONTROL OF MULTIPLE REMOTE ELECTRONIC SYSTEMS

(75) Inventors: Thomas R. Olson, Holland, MI (US); Michael R. Benson, Holland, MI (US); Thomas S. Wright, Holland, MI (US); Steven L. Geerlings, Zeeland, MI (US); David A. Blaker, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 805 days.

(21) Appl. No.: 11/602,152

(22) Filed: Nov. 20, 2006

(65) Prior Publication Data

US 2007/0063814 A1 Mar. 22, 2007

Related U.S. Application Data

(63) Continuation of application No. 10/351,884, filed on Jan. 27, 2003, now abandoned, which is a continuation-in-part of application No. 10/127,384, filed on Apr. 22, 2002, now abandoned.

(51) Int. Cl.
*G05B 19/00* (2006.01)

(52) U.S. Cl. ........................ 340/5.61; 340/5.7; 340/4.42

(58) Field of Classification Search ................. 340/5.61, 340/5.64, 825.69, 825.72, 5.65, 5.7, 4.41, 340/4.42

See application file for complete search history.

(56) References Cited

U.S. PATENT DOCUMENTS

| | | | | |
|---|---|---|---|---|
| 3,936,833 | A | 2/1976 | Bush | |
| 4,241,870 | A | 12/1980 | Marcus | |
| 4,529,980 | A | 7/1985 | Liotine et al. | |
| 4,535,333 | A | 8/1985 | Twardowski | |
| 4,750,118 | A | 6/1988 | Heitschel et al. | |
| 4,825,200 | A | 4/1989 | Evans et al. | |
| 4,866,434 | A | 9/1989 | Keenan | |
| 4,988,992 | A | 1/1991 | Heitschel et al. | |
| 5,058,023 | A * | 10/1991 | Kozikaro | 701/217 |
| 5,379,453 | A | 1/1995 | Tigwell | |
| 5,402,105 | A | 3/1995 | Doyle et al. | |

(Continued)

FOREIGN PATENT DOCUMENTS

DE 197 32 157 A1 1/1998

(Continued)

OTHER PUBLICATIONS

Skylink Garage Door/Gate Remote Control, Model 39 User's Instructions, Steps for Programming the Transmitter, 20 pages.
International Search Report for PCT/US2004/002150 mailed Aug. 5, 2004, 4 pages.
International Search Report for PCT/EP99/06546 mailed Jan. 11, 2000, 2 pages.
Derwent Abstract of DE 197 32 157A1; WPI Acc. No. 1998-089736/199809.
Advisory Action for U.S. Appl. No. 10/127,384, mailed Jan. 26, 2005, 3 pages.
Advisory Action for U.S. Appl. No. 10/351,884, mailed Sep. 19, 2006, 3 pages.

(Continued)

*Primary Examiner* — Vernal Brown
(74) *Attorney, Agent, or Firm* — Foley & Lardner LLP

(57) ABSTRACT

An in-vehicle transmitter for wirelessly controlling a plurality of remote electronic systems is described. The transmitter includes a memory configured to store a plurality of wireless control code for the plurality of remote electronic systems. The plurality of wireless control code includes a first code to control the operation of a first remote electronic system and a second code different than the first code to control the operation of a second remote electronic system. The transmitter further includes a control circuit mounted to a vehicle interior element configured, in response to operator actuation of one switch, so that the transmitter provides a first wireless control signal having the first code and a second wireless control signal having the second code.

22 Claims, 8 Drawing Sheets

U.S. PATENT DOCUMENTS 5,442,340 A 8/1995 Dykema
5,479,155 A 12/1995 Zeinstra et al.
5,552,806 A 9/1996 Lenchik
5,583,485 A 12/1996 Van Lente et al.
5,596,316 A 1/1997 Honeck
5,614,885 A 3/1997 Van Lente et al.
5,614,891 A * 3/1997 Zeinstra et al. .......... 340/825.22
5,619,190 A 4/1997 Duckworth et al.
5,627,529 A 5/1997 Duckworth et al.
5,646,701 A 7/1997 Duckworth et al.
5,661,651 A 8/1997 Geschke et al.
5,661,804 A 8/1997 Dykema et al.
5,680,134 A 10/1997 Tsui
5,686,903 A 11/1997 Duckworth et al.
5,699,054 A 12/1997 Duckworth
5,699,055 A 12/1997 Dykema et al.
5,708,415 A 1/1998 Van Lente et al.
5,758,300 A 5/1998 Abe
5,774,064 A 6/1998 Lambropoulos et al.
5,790,948 A 8/1998 Eisfeld et al.
5,793,300 A 8/1998 Suman et al.
5,810,420 A 9/1998 Welling
5,841,390 A 11/1998 Tsui
5,844,473 A 12/1998 Kaman
5,854,593 A 12/1998 Dykema et al.
5,898,392 A 4/1999 Bambini et al.
5,903,226 A 5/1999 Suman et al.
5,926,087 A 7/1999 Busch et al.
5,990,828 A 11/1999 King
5,995,898 A 11/1999 Tuttle
6,005,508 A 12/1999 Tsui
6,008,735 A 12/1999 Chiloyan et al.
6,020,829 A 2/2000 Hormann
6,021,319 A 2/2000 Tigwell
6,023,241 A 2/2000 Clapper
6,055,468 A 4/2000 Kaman et al.
6,072,404 A 6/2000 Nolan et al.
6,078,270 A * 6/2000 Shim ........................ 340/825.72
6,078,271 A 6/2000 Roddy et al.
6,091,330 A 7/2000 Swan et al.
6,091,343 A 7/2000 Dykema et al.
6,127,922 A 10/2000 Roddy et al.
6,127,961 A 10/2000 Stacy et al.
6,131,019 A 10/2000 King
6,137,421 A 10/2000 Dykema
6,144,114 A 11/2000 Chutorash
6,154,148 A 11/2000 Fluharty et al.
6,160,319 A 12/2000 Marougi et al.
6,181,255 B1 1/2001 Crimmins et al.
6,188,889 B1 2/2001 Tsai
6,191,701 B1 2/2001 Bruwer
6,246,784 B1 6/2001 Summers et al.
6,249,673 B1 6/2001 Tsui
6,265,987 B1 7/2001 Wang et al.
6,271,765 B1 8/2001 King et al.
6,275,379 B1 8/2001 Quinno et al.
6,308,083 B2 10/2001 King
6,333,698 B1 12/2001 Roddy
6,337,173 B2 1/2002 Jen et al.
6,396,408 B2 5/2002 Drummond et al.
6,426,706 B1 7/2002 King
6,472,885 B1 10/2002 Green et al.
6,476,732 B1 11/2002 Stephan
6,486,795 B1 11/2002 Sobel et al.
6,512,461 B1 1/2003 Benzie et al.
6,525,645 B2 2/2003 King et al.
6,556,681 B2 4/2003 King
6,556,813 B2 4/2003 Tsui
6,559,775 B1 5/2003 King
6,563,430 B1 * 5/2003 Kemink et al. .......... 340/825.49
6,593,856 B1 * 7/2003 Madau ..................... 340/825.69
6,597,374 B1 7/2003 Baker et al.
6,615,132 B1 9/2003 Nagasaka et al.
6,700,476 B1 * 3/2004 Okada et al. ................. 340/5.62
6,703,941 B1 3/2004 Blaker
6,724,339 B2 4/2004 Conway et al.
6,822,603 B1 11/2004 Crimmins et al.
2001/0007086 A1 7/2001 Rogers et al.
2002/0034303 A1 3/2002 Farris et al.
2002/0163440 A1 11/2002 Tsui
2002/0191794 A1 12/2002 Farris et al.
2003/0033540 A1 2/2003 Fitzgibbon
2003/0112121 A1 6/2003 Wilson
2003/0118187 A1 6/2003 Fitzgibbon
2003/0153306 A1 8/2003 Study et al.
2003/0193427 A1 * 10/2003 Schroeder et al. ............ 341/176
2003/0197595 A1 10/2003 Olson et al.
2003/0216139 A1 11/2003 Olson et al.
2004/0017292 A1 1/2004 Reese et al.
2004/0100391 A1 5/2004 Guthrie
2005/0024184 A1 2/2005 Chuey
2005/0024185 A1 2/2005 Chuey
2005/0024229 A1 2/2005 Chuey
2005/0024230 A1 2/2005 Chuey
2005/0024254 A1 2/2005 Chuey
2005/0024255 A1 2/2005 Chuey
2005/0026601 A1 2/2005 Chuey
2005/0026602 A1 2/2005 Chuey et al.
2005/0026605 A1 2/2005 Guthrie et al.
2005/0046545 A1 3/2005 Skekloff et al.

FOREIGN PATENT DOCUMENTS

DE 198 49 194 A1 4/2000
EP 0 626 635 B1 11/1994
EP 0 801 342 B1 10/1997
EP 1 052 608 A1 11/2000
EP 1 129 441 B1 9/2001
EP 1 176 392 A1 1/2002
FR 2 792 444 A1 10/2000
GB 2 325 552 A 11/1998
GB 2 363 681 A 1/2002
WO WO 99/63308 A1 12/1999
WO WO 99/64274 A1 12/1999
WO WO 00/12850 A1 3/2000
WO WO 00/17737 A1 3/2000
WO WO 00/70577 A1 11/2000
WO WO 00/75905 A1 12/2000
WO WO 01/43103 A2 6/2001
WO WO 01/73801 1/2002
WO WO 02/080129 A2 10/2002
WO WO 2004/034352 A1 4/2004
WO WO 2004/036526 A2 4/2004
WO WO 2004/043750 A2 5/2004
WO WO 2004/066514 A1 8/2004
WO WO 2004/068772 A2 8/2004
WO WO 2004/077729 A2 9/2004
WO WO 2004/104966 A2 12/2004
WO WO 2005/002080 A1 1/2005

OTHER PUBLICATIONS

International Search Report for International Patent Application No. PCT/US2003/035641 mailed Jun. 3, 2004, 4 pages.

International Search Report and Written Opinion for International Patent Application No. PCT/US2004/005257 mailed Sep. 7, 2004, 10 pages.

International Search Report and Written Opinion for International Patent Application No. PCT/US2004/015886 mailed Dec. 10, 2004, 10 pages.

Office Action for U.S. Appl. No. 10/127,384, mailed Mar. 26, 2004, 16 pages.

Office Action for U.S. Appl. No. 10/127,384, mailed Sep. 14, 2004, 16 pages.

Office Action for U.S. Appl. No. 10/351,884, mailed Jan. 12, 2005, 16 pages.

Office Action for U.S. Appl. No. 10/351,884, mailed Jun. 23, 2005, 9 pages.

Office Action for U.S. Appl. No. 10/351,884, mailed Jan. 4, 2006, 18 pages.

Office Action for U.S. Appl. No. 10/351,884, mailed Jun. 19, 2006, 15 pages.

Written Opinion for International Patent Application No. PCT/US2004/002150, 6 pages.

* cited by examiner

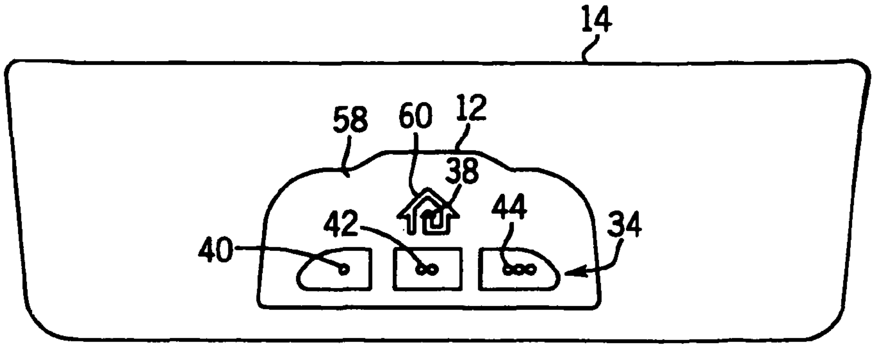
FIG. 3
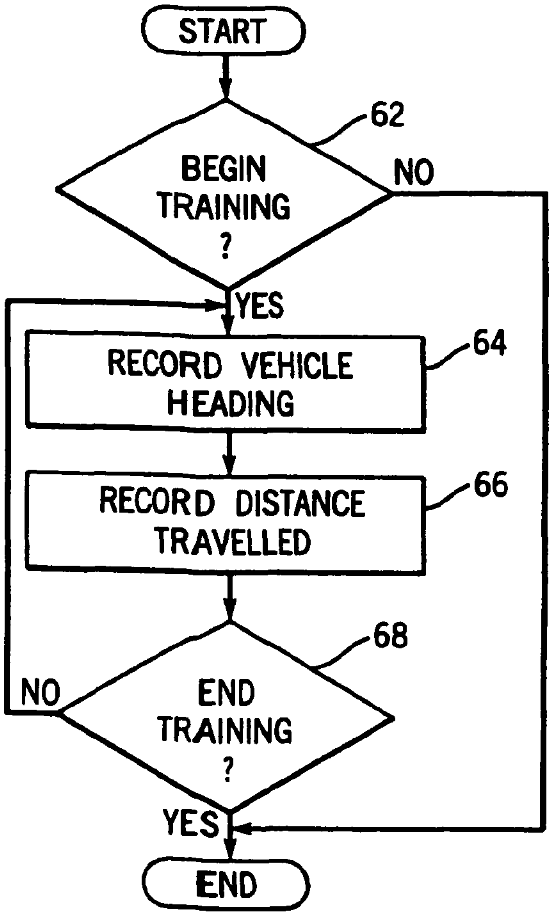
FIG. 4
| HEADING | DISTANCE |
|---|---|
| NORTH | 20 |
| EAST | 30 |
| NORTH | 10 |
FIG. 5

SYSTEM AND METHOD FOR WIRELESS CONTROL OF MULTIPLE REMOTE ELECTRONIC SYSTEMS

CROSS REFERENCE TO RELATED APPLICATIONS

This application is a continuation of U.S. application Ser. No. 10/351,884, filed Jan. 27, 2003, which is a continuation-in-part of U.S. application Ser. No. 10/127,384, filed Apr. 22, 2002, both of which are hereby incorporated by reference.

BACKGROUND

In the field of wireless control of remote electronic systems, technological advances have been developed to improve convenience, security, and functionality for the user. One example is a trainable transceiver for use with various remote electronic systems, such as security gates, garage door openers, lights, and security systems. A user trains the trainable transceiver by, for example, transmitting a signal from a remote controller in the vicinity of the trainable transceiver. The trainable transceiver learns the carrier frequency and data code of the signal and stores this code for later retransmission. In this manner, the trainable transceiver can be conveniently mounted within a vehicle interior element (e.g., visor, instrument panel, overhead console, etc.) and can be configured to operate one or more remote electronic systems.

Further advances are needed in the field of wireless control of remote electronic systems, particularly in the case of using automotive electronics to control remote electronic systems. As automotive manufacturers are adding increased electronic systems to the vehicle to improve convenience, comfort, and productivity, simplifying the interface and control of these electronic systems is also becoming increasingly important.

Navigation systems, such as the global positioning system, vehicle compass, distance sensors, and other navigation systems, are being added to vehicles to provide navigation information to the vehicle occupants. On-board navigation systems also present opportunities to improve existing electronic systems to take advantage of vehicle location data which was not previously available.

What is needed is an improved wireless control system and method for wireless control of a remote electronic system from a vehicle, wherein the location of the vehicle is used to improve the convenience and functionality of the wireless control system. Further, what is needed is a system and method of training a wireless control system on a vehicle for wireless control of a remote electronic system based on the location of the vehicle. Further still, what is needed is a transmitter for wirelessly controlling a plurality of remote electronic systems. Further yet, what is needed is a system and method for wireless control of a garage door opener based on the location of the wireless control system.

The teachings hereinbelow extend to those embodiments which fall within the scope of the appended claims, regardless of whether they accomplish one or more of the above-mentioned needs.

SUMMARY

According to an exemplary embodiment, an in-vehicle transmitter for wirelessly controlling a plurality of remote electronic systems is described. The transmitter includes a memory configured to store a plurality of wireless control code for the plurality of remote electronic systems. The plurality of wireless control code includes a first code to control the operation of a first remote electronic system and a second code different than the first code to control the operation of a second remote electronic system. The transmitter further-includes a control circuit mounted to a vehicle interior element configured, in response to operator actuation of one switch, so that the transmitter provides a first wireless control signal having the first code and a second wireless control signal having the second code.

According to another exemplary embodiment, an in-vehicle transmitter for wirelessly controlling a plurality of remote electronic systems is described. The transmitter includes a memory configured to store data for generating wireless control signals, and a control circuit mounted to a vehicle interior element configured, in response to operator actuation of one switch, so that the transmitter provides a first wireless control signal and a second wireless control signal, wherein the first wireless control signal is modulated differently than the second wireless control signal.

According to another exemplary embodiment, a method for training a transmitter for a wireless control system in a vehicle to wirelessly control a plurality of remote electronic systems based upon a single event is described. The method includes receiving a request from a user to begin training a plurality of wireless control signals to be associated with a single event, receiving the single event, receiving at the in-vehicle wireless control system, a first wireless control signal having a first wireless control code, identifying and storing the first wireless control code on the first wireless control signal, associating the first wireless control signal with the single event, whereby the in-vehicle wireless control system can wirelessly control a first remote electronic system by transmitting the first wireless control code of the first wireless control signal in response to the single event, receiving at the in-vehicle wireless control system, a second wireless control signal having a second wireless control code, identifying and storing the second wireless control code on the second wireless control signal, and associating the second wireless control signal with the single event, whereby the in-vehicle wireless control system can wirelessly control a second remote electronic system by transmitting the second wireless control code of the second wireless control signal in response to the single event.

BRIEF DESCRIPTION OF THE DRAWINGS

The invention will become more fully understood from the following detailed description, taken in conjunction with the accompanying drawings, wherein like reference numerals refer to like parts, and in which:

FIG. 3 is a schematic diagram of a visor having a wireless control system mounted thereto, according to an exemplary embodiment;

FIG. 4 is a flowchart of a method of training the wireless control system of FIG. 2, according to an exemplary embodiment;

FIG. 5 is a chart of a set of data pairs stored in memory, each data pair including a heading and a corresponding distance, according to an exemplary embodiment;

DETAILED DESCRIPTION OF EXEMPLARY EMBODIMENTS

Figure 1:
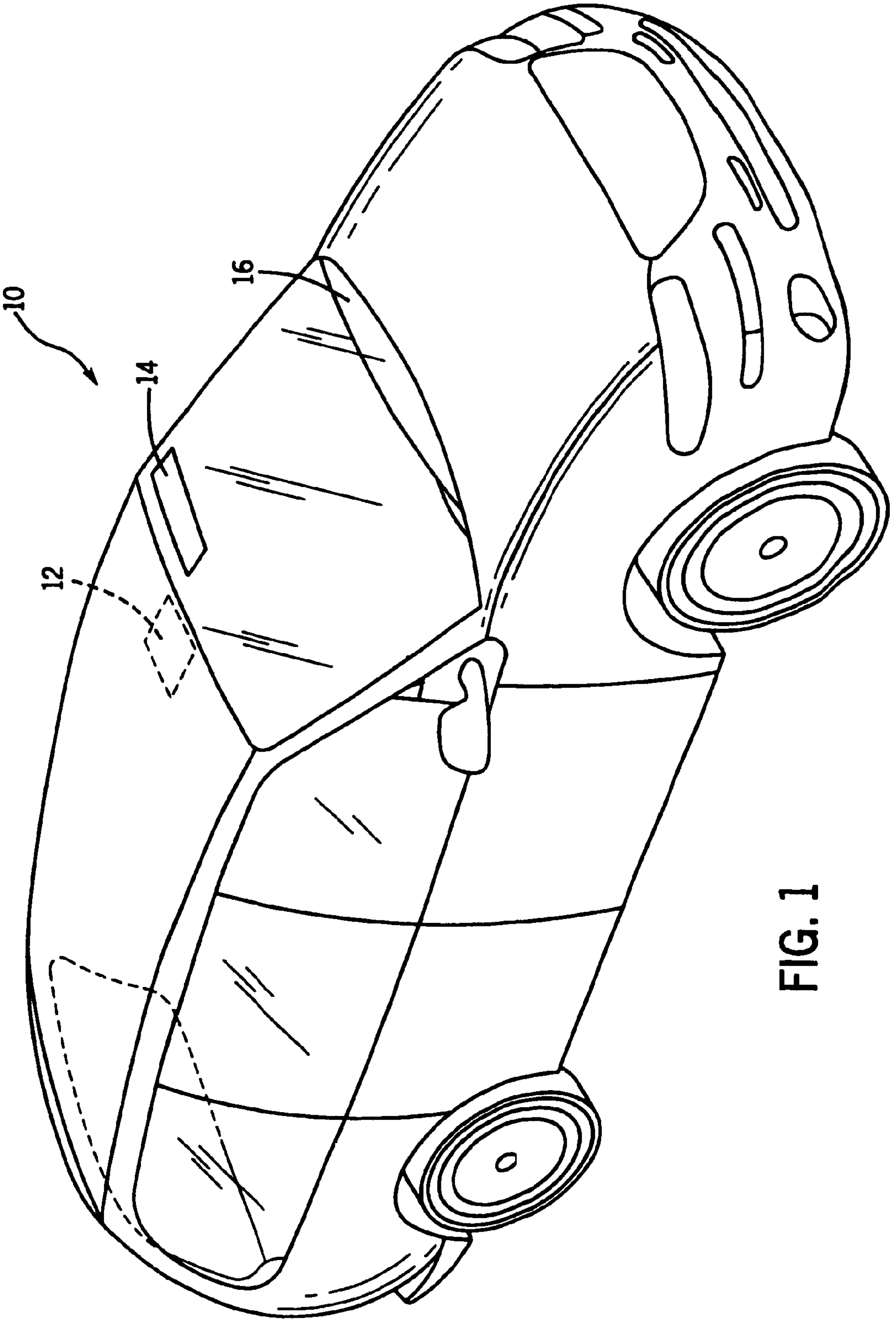
FIG. 1 is a perspective view of a vehicle having a wireless control system, according to an exemplary embodiment.

Referring first to FIG. 1, a vehicle 10, which may be an automobile, truck, sport utility vehicle (SUV), mini-van, or other vehicle, includes a wireless control system 12. Wireless control system 12, the exemplary embodiments of which will be described hereinbelow, is illustrated mounted to an overhead console of vehicle 10. Alternatively, one or more of the elements of wireless control system 12 may be mounted to other vehicle interior elements, such as, a visor 14 or instrument panel 16. Alternatively, wireless control system 12 could be mounted to a key chain, keyfob or other handheld device.

Figure 2:
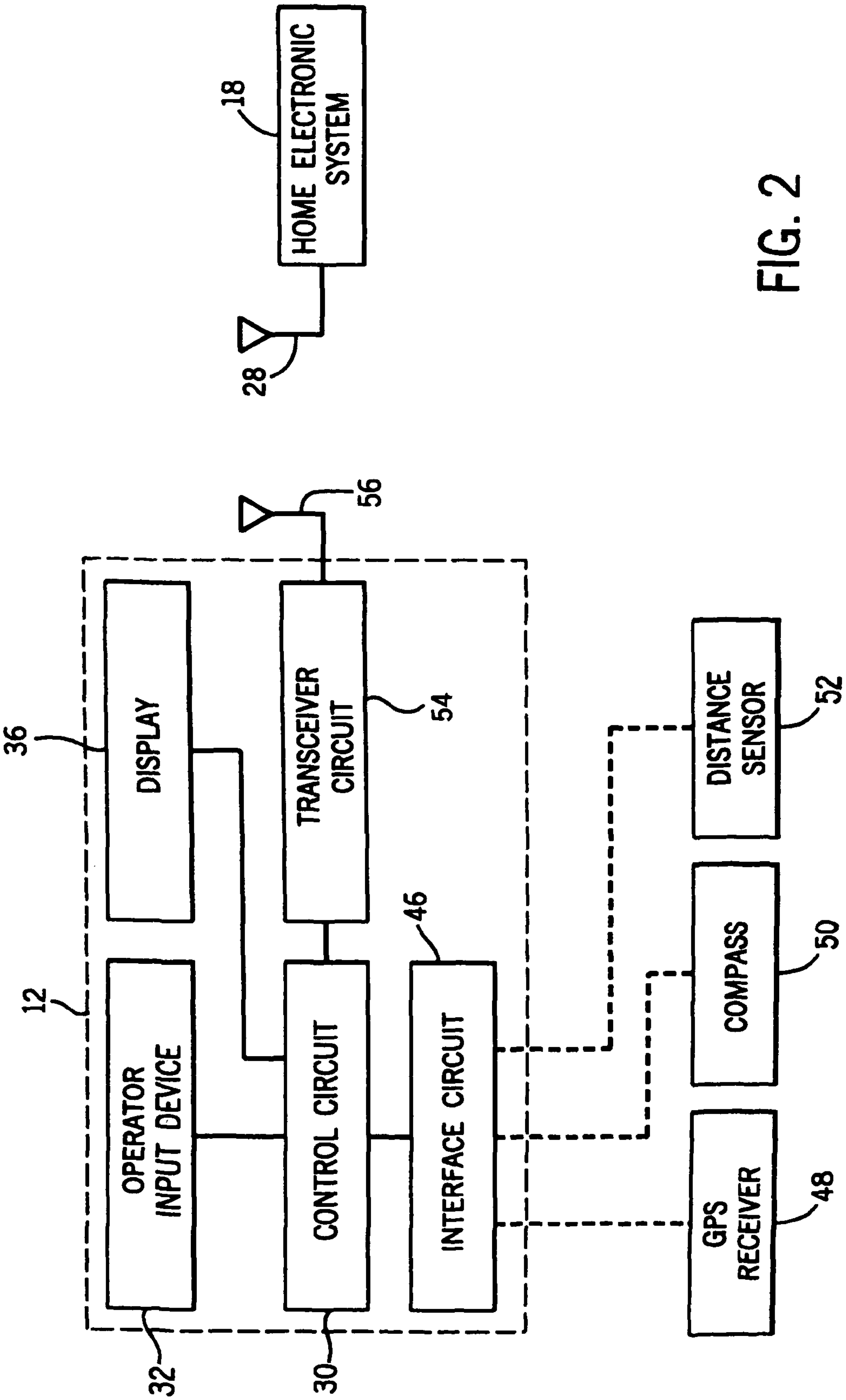
FIG. 2 is a block diagram of a wireless control system and a remote electronic system, according to an exemplary embodiment.

Referring now to FIG. 2, wireless control system 12 is illustrated along with a remote electronic system 18 which may be any of a plurality of remote electronic systems, such as, a garage door opener, a security gate control system, security lights, home lighting fixtures or appliances, a home security system, etc. For example, remote electronic system 18 may be a garage door opener, such as the Whisper Drive7 garage door opener, manufactured by the Chamberlain Group, Inc., Elmhurst, Ill. Remote electronic system 18 may also be a lighting control system using the X10 communication standard. Remote electronic system 18 includes an antenna 28 for receiving wireless signals including control data which will control remote electronic system 18. The wireless signals are preferably in the ultra-high frequency (UHF) band of the radio frequency spectrum, but may alternatively be infrared signals or other wireless signals.

Wireless control system 12 includes a control circuit 30 configured to control the various portions of system 12, to store data in memory, to operate preprogrammed functionality, etc. Control circuit 30 may include various types of control circuitry, digital and/or analog, and may include a microprocessor, microcontroller, application-specific integrated circuit (ASIC), or other circuitry configured to perform various input/output, control, analysis, and other functions to be described herein. Control circuit 30 is coupled to an operator input device 32 which includes one or more push button switches 34 (see FIG. 3), but may alternatively include other user input devices, such as, switches, knobs, dials, etc., or even a voice-actuated input control circuit configured to receive voice signals from a vehicle occupant and to provide such signals to control circuit 30 for control of system 12. System 12 further includes a memory 74, which may be volatile or non-volatile memory, and may include read only memory (ROM), random access memory (RAM), flash memory, and/or any other memory type.

Control circuit 30 is further coupled to a display 36 which includes a light-emitting diode (LED), such as, display element 38. Display 36 may alternatively include other display elements, such as a liquid crystal display (LCD), a vacuum florescent display (VFD), or other display elements.

Wireless control system 12 further includes an interface circuit configured to receive navigation data from one or more navigation data sources, such as a GPS receiver 48, a vehicle compass 50, a distance sensor 52, and/or other sources of navigation data, such as gyroscopes, etc. Interface circuit 46 is an electrical connector in this exemplary embodiment having pins or other conductors for receiving power and ground, and one or more navigation data signals from a vehicle power source and one or more navigation data sources, respectively, and for providing these electrical signals to control circuit 30. GPS receiver 48 is configured to receive positioning signals from GPS satellites, to generate location signals (e.g., latitude/longitude/ altitude) representative of the location of wireless control system 12, and to provide these location signals to control circuit 30 via interface circuit 46. Compass 50 includes compass sensors and processing circuitry configured to receive signals from the sensors representative of the Earth's magnetic field and to provide a vehicle heading to control circuit 30. Compass 50 may use any magnetic sensing technology, such as magneto-resistive, magneto-inductive, or flux gate sensors. The vehicle heading may be provided as an octant heading (N, NE, E, SE, etc.) or in degrees relative to North, or in some other format. Distance sensor 52 may include an encoder-type sensor to measure velocity and/or position or may be another distance sensor type. In this embodiment, distance sensor 52 is a magnetic sensor coupled to the transmission and configured to detect the velocity of the vehicle. A vehicle bus interface receives the detected signals and calculates the distance traveled based on a clock pulse on the vehicle bus. Other distance and/or velocity sensor types are contemplated, such as, using GPS positioning data.

Wireless control system 12 further includes a transceiver circuit 54 including transmit and/or receive circuitry configured to communicate via antenna 56 with remote electronic system 18. Transceiver circuit 54 is configured to transmit wireless control signals having control data which will control remote electronic system 18. Transceiver circuit 54 is configured, under control from control circuit 30, to generate a carrier frequency at any of a number of frequencies in the ultra-high frequency range, preferably between 260 and 470 megahertz (MHz), wherein the control data modulated on to the carrier frequency signal may be frequency shift key (FSK) or amplitude shift key (ASK) modulated, or may use another modulation technique. The control data on the wireless control signal may be a fixed code or a rolling code or other cryptographically encoded control code suitable for use with remote electronic system 18.

Referring now to FIG. 3, an exemplary wireless control system 12 is illustrated coupled to a vehicle interior element, namely a visor 14. Visor 14 is of conventional construction, employing a substantially flat, durable interior surrounded by a cushioned or leather exterior. Wireless control system 12 is mounted to visor 14 by fasteners, such as, snap fasteners, barbs, screws, bosses, etc. and includes a molded plastic body 58 having three push button switches disposed therein. Each of the switches includes a respective back-lit icon 40, 42, 44. Body 58 further includes a logo 60 inscribed in or printed on body 58 and having a display element 30 disposed therewith. During training and during operation, display element 38 is selectively lit by control circuit 30 (FIG. 2) to communicate certain information to the user, such as, whether a training process was successful, whether the control system 12 is transmitting a wireless control signal, etc. The embodiment shown in FIG. 3 is merely exemplary, and alternative embodiments may take a variety of shapes and sizes, and have a variety of different elements.

In operation, wireless control system 12 is configured to receive one or more characteristics of an activation signal sent from an original transmitter associated with remote electronic system 18. The original transmitter is a transmitter, typically a hand-held transmitter, which is sold with remote electronic system 18 or as an after-market item, and which is configured to transmit an activation signal at a predetermined carrier frequency and having control data configured to actuate remote electronic system 18. For example, the original transmitter can be a hand-held garage door opener transmitter configured to transmit a garage door opener signal at a frequency, such as 355 megahertz (MHz), wherein the activation signal has control data, which can be a fixed code or a cryptographically-encoded code. Remote electronic system 18 is configured to open a garage door, for example, in response to receiving the activation signal from the original transmitter.

Wireless control system 12 is configured to receive one or more characteristics of the activation signal from the original transmitter or from another source, which characteristics can include the frequency, control data, modulation scheme, etc. In this embodiment, wireless control system 12 is configured to learn at least one characteristic of the activation signal by receiving the activation signal, determining the frequency of the activation signal, and demodulating the control data from the activation signal. Wireless control system 12 can be a Homelink® trainable transceiver system, manufactured by Johnson Controls Interiors LLC, Holland, Mich., and may be constructed according to one or more embodiments disclosed in U.S. Pat. Nos. 6,091,343, 5,854,593 or 5,708,415, which are herein incorporated by reference in their entirety. Alternatively, wireless control system 12 can receive one or more characteristics of the activation signal by other methods of learning. For example, the one or more characteristics of the activation signal can be preprogrammed into memory 74 during manufacture of wireless control system 12 or can be input via operator input device 32 (which can include a key pad, buttons, etc.). In this manner, wireless control system 12 need not actually receive the activation signal in order to receive characteristics of the activation signal. Wireless control system 12 can receive the characteristics of the signal by any of these methods and store the characteristics of the activation signal in memory 74.

According to one exemplary embodiment, wireless control system 12 is fixedly coupled to a vehicle interior element. This fixed coupling provides a convenient location for a trainable transmitter in vehicle 14, and further prevents an operator from losing, misplacing, dropping, or otherwise losing control of wireless control system 12. The term "fixedly coupled" refers to the characteristic that wireless control system 12 is not removable from the vehicle interior element, though it may be moved within the vehicle interior element (for example, in a sliding configuration).

In further operation, wireless control system 12 is configured for wireless control of remote electronic system 18 based on the location of wireless control system 12. Control circuit 30 is configured to receive navigation data from a navigation data source to determine a proximity between system 12 and system 18, and to command transceiver circuit 54 to transmit a wireless control signal based on the proximity between system 12 and system 18.

Several training steps can be performed by the user. Remote electronic system 18 is placed in an "auto open" mode. System 12 is also placed in an "auto open" mode. Both such mode selections can be selected using operator input devices. System 12 is trained to learn the location of remote electronic system 18, which may be defined as the location of one or more of a garage door, a security gate, a home lighting or appliance element, a home security system, the location of the home associated with remote electronic system 18, the location of antenna 28, or any other location associated with remote electronic system 18. In this exemplary embodiment, system 12 learns the location of remote electronic system 18 in one of two ways. In a first method, in which data from GPS receiver 48 is available, the user actuates one of switches 34 to change the mode of wireless control system 12 to a training mode. With system 12, and more particularly the antenna of GPS receiver 48, positioned at the location of remote electronic system 18, the user actuates one of the switches 34 to command control circuit 30 to take a location reading from GPS receiver 48 and to store this location information in memory, preferably in non-volatile memory, in order to train system 12 to learn the location of remote electronic system 18. Alternatively, in a system wherein GPS signals are not available, system 12 uses information from compass 50 and distance sensor 52 to train system 12 to learn the location of remote electronic system 18, as will now be described with reference to FIG. 4.

Referring to FIG. 4, an exemplary method of training a wireless control system on a vehicle for wireless control of a remote electronic system will now be described. At step 62, control circuit 30 identifies whether the user has requested system 12 to enter a training mode to begin training. For example, the user may hold down one, two, or more of switches 34 for a predetermined time period (e.g., 10 seconds, 20 seconds, etc.) to place control circuit 30 in a training mode, or the user may actuate a separate input device (not shown in FIG. 3) coupled to control circuit 30 (FIG. 2) to place system 12 in the training mode. Once training has begun, at step 64, control circuit 30 receives heading signals from compass 50 via interface circuit 46. Control circuit 30 records the vehicle heading in memory, wherein the vehicle heading is received from a GPS receiver or a compass. At step 66, control circuit 30 further receives distance signals representing the distance traveled by the vehicle from distance sensor 52 via interface circuit 46. The distance traveled is recorded in memory. Typically, the heading signals and distance traveled are recorded over one or more turns of vehicle 10 to provide a unique path which can be identified as a path associated with the vehicle approaching remote electronic system 18. Heading data and distance data are recorded as the vehicle makes at least one change in heading. Heading data and distance data are recorded in a set of data pairs representing a path beginning some distance from system 18 (e.g., one block, multiple blocks, one mile, several miles, etc.) and ending in the vicinity (e.g., less than a few hundred feet) of system 18.

Typically a vehicle operator will use between one and three routes to approach their home. The method described in FIG. 4 can be repeated for multiple routes. The operator may program some routes for which they wish to cause automatic transmission of wireless data, as will be described below, and may further choose not to program system 12 for other routes for which they do not want to cause automatic transmission of wireless signals. Preferably, training begins at a location that is far enough from the home that a unique route can be established, yet close enough to the home so that the route home is consistent over several trips home. The vehicle operator can decide whether to include the final turn into the driveway to make the route unique. If the final turn into the driveway is included, the automatic transmit function, as will be described hereinafter, will be delayed until after the car has completed its turn into the driveway.

When the user travels in the vehicle to the end of the training path (i.e., in the vicinity of system 18), the user stops the vehicle and presses one of switches 34 corresponding to the end of training, as indicated at step 68. Between the start and end of the training path, control circuit 30 records in memory the distance traveled on each heading during the drive to the home. Control circuit 30 will then record and save in memory one or more tables such as that shown in FIG. 5. FIG. 5 illustrates a set of predetermined heading and distance data represented as a plurality of data pairs, each data pair including a heading and a corresponding distance. For example, in the exemplary data pair shown, the heading of north is taken for a distance of 20 units (each unit representing a 20 foot increment in this exemplary embodiment, though alternative measures may be implemented), a heading of east for 30 units, and a heading of north for 10 units.

Having trained system 12 to identify the location of remote electronic system 18 using either GPS positioning signals or by identifying one or more paths to remote electronic system 18, or by otherwise training system 12 to learn the proximity or distance between system 12 and system 18, system 12 may then be used in its operative mode to automatically transmit wireless control data based on the proximity between system 12 and system 18. For example, when GPS positioning signals are used, during normal vehicle driving, control circuit 30 continuously monitors the location of the vehicle and, when the vehicle is within a predetermined distance (e.g., 5 miles, 1 mile, 2 blocks, etc.), control circuit 30 commands transceiver circuit 54 to transmit a wireless control signal having control data to control one or more of remote electronic systems 18. In this exemplary embodiment, the wireless control signal is transmitted automatically (i.e., without requiring the user to press a button) in two five-second bursts with a three second delay between bursts. Alternatively, the wireless control signal can be transmitted with greater or fewer numbers of bursts and with different durations and delay times.

In the case where vehicle compass and distance sensor data are utilized, control circuit 30 will continuously monitor heading and distance information via interface circuit 46 and will compare the heading and distance information to the sets of data pairs in memory representing one or more paths indicating when a vehicle returns to the home. When a match is identified, control circuit 30 will command transceiver 54 to transmit the wireless control signal. Preferably, a tolerance of +/−20% (or some other percentage) is provided for the distances during the comparison steps.

According to one exemplary embodiment, when wireless control system 12 is within a first proximity of remote electronic system 18, wireless control data is automatically transmitted in a plurality of bursts. Thereafter, wireless control system 12 monitors the proximity of system 12 to system 18 until the proximity is at a second proximity which is greater than the first proximity. After system 12 is outside the second proximity, system 12 is "reset," such that when systems 12 and 18 are again within the first proximity, system 12 again automatically transmits the wireless control signal. Alternatively, the first and second proximities can be the same or the second proximity can be less than the first. In either event, system 12 advantageously prevents multiple retransmissions while system 12 is within the first proximity, but not having just returned home.

According to another exemplary embodiment, wireless control system 12 can be trained to automatically learn the pathway to remote electronic system 18. In this embodiment, system 12 continuously monitors travel vectors (i.e., distance and heading) and stores the vectors in a buffer. When system 12 detects a manual actuation of one of input devices 34 to send wireless control signals, system 12 concludes it is at or near system 18. Therefore, system 12 records a predetermined number of previous travel vectors (e.g., three, five, ten, etc.) in memory. The next time system 12 travels the same recorded travel vector pattern, system 12 automatically transmits wireless control data to actuate system 18. System 12 determines whether the same recorded travel vector pattern is traveled by waiting until a first vector of a pattern is found, then comparing the vector of the next turn to the next vector in the pattern, and so on, until all vectors in the pattern have been matched. Pattern matching and position matching (as with GPS distance data) can be used together to verify that the system works effectively. Preferably, system 12 requires the user to select this automatic training feature using one or more of input devices 34 before automatic training will take place. Multiple paths home can be recorded in this manner. Preferably, the travel path includes the turn into the driveway of the home so that automatic transmission of wireless control data can be prevented by stopping the vehicle on the street in front of the house.

Figure 8:
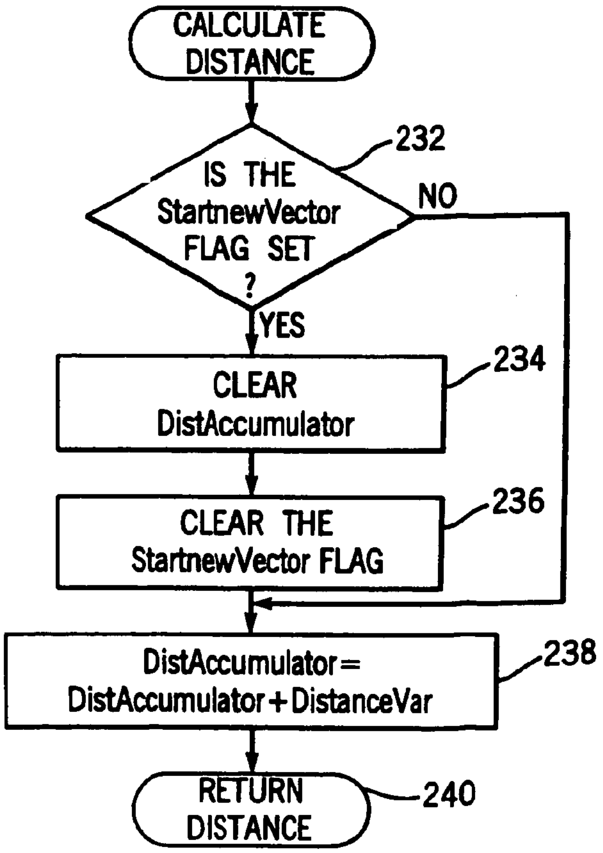
FIG. 8 is a flowchart of the "Calculate Distance" subroutine of the method of FIG. 7, according to an exemplary embodiment.
Figure 9:
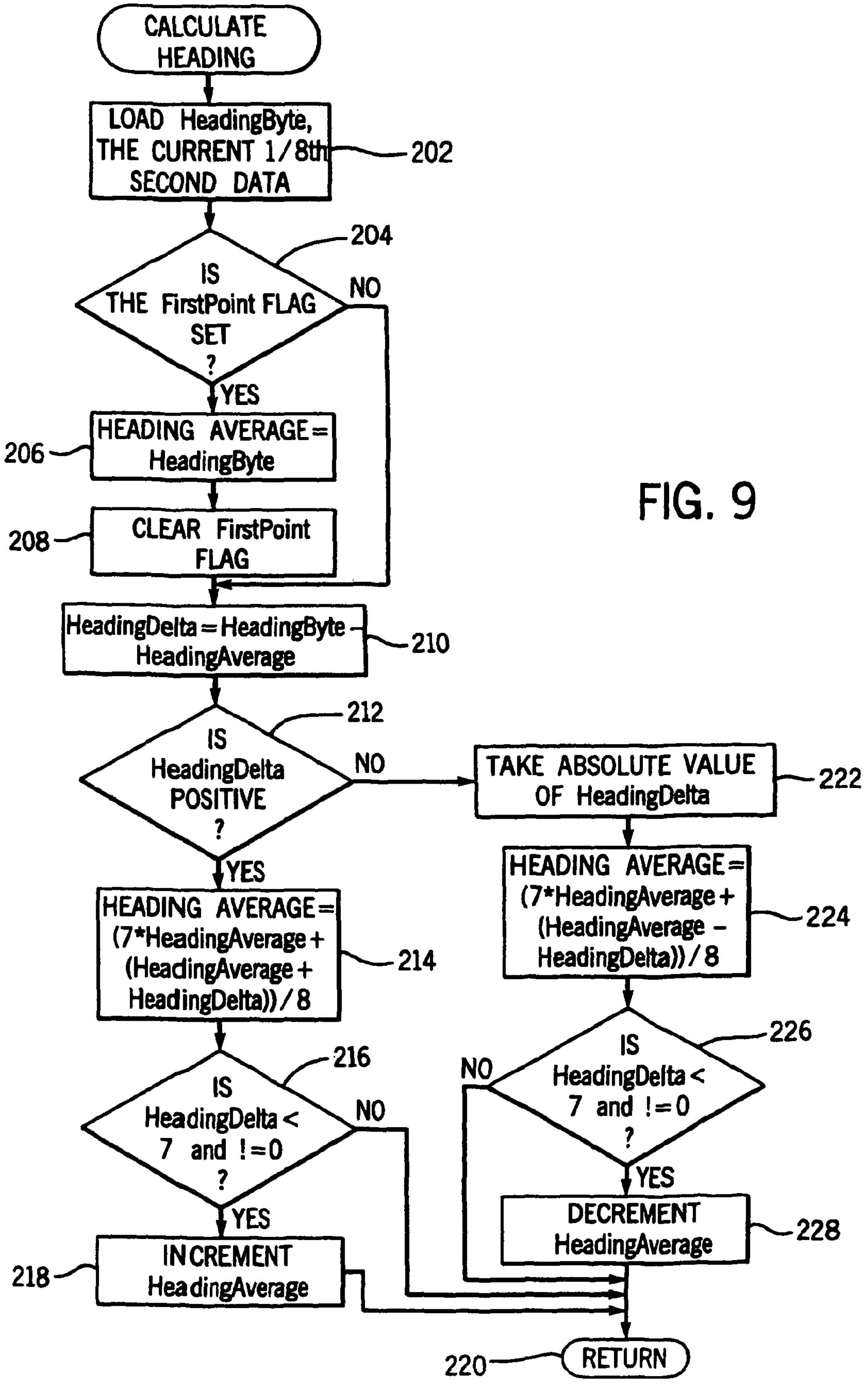
FIG. 9 is a flowchart of a "Calculate Heading" subroutine of the method of FIG. 7, according to an exemplary embodiment.

Referring now to FIGS. 7-11, a method of wireless control of a remote electronic system based on location will be described, according to another exemplary embodiment. The method can be operable in software and/or hardware on system 12 in any of its various embodiments. At step 200, the "Calculate Heading" subroutine is called. Referring to FIG. 9, at step 202, every $\frac{1}{8}^{th}$ second, the current heading of the vehicle is detected. At step 204, if the heading byte loaded is the first point of a heading vector, a heading average is set equal to the heading byte at step 206, a FirstPoint flag is set at step 208, and the method proceeds to step 210. At step 204, if the loaded heading is not the first point of a heading vector, the method proceeds to step 210.

At step 210, the change in heading is calculated by subtracting the average heading from the recently loaded heading. At step 212, if the heading change is positive, a new heading average is calculated at step 214 according to the following equation:

$$\text{Heading Average}=(7*\text{HeadingAverage}+(\text{HeadingAverage}+\text{HeadingDelta}))/8$$

At step 216, if the change in heading is less than 7 and not equal to 0, the heading average is incremented at step 218 and the subroutine returns at step 220. If the change in heading is greater than 7 or equal to 0, the heading average is not incremented, and the subroutine returns at step 220.

At step 212, if the heading change is not positive, the absolute value of the heading data is taken at step 222, and the heading average is calculated at step 224 using the same equation as step 214. After step 224, at step 226, if the heading delta is less than 7 and not equal to 0, the heading average is decremented at step 228, and the subroutine ends at step 220. At step 226, if the change in heading is greater than 7 or equal to 0, the method proceeds to step 220 to return to the main routine.

Referring again to FIG. 7, upon return of the "Calculate Heading" subroutine, the main routine calls the "Calculate Distance" subroutine at step 230. Referring to FIG. 8, at step 232, if the distance is the first distance point of a new vector, the distance accumulator is cleared at step 234, and a flag is set at step 236 to indicate that the distance of a new vector is being calculated. The method then proceeds to step 238. If the distance calculation is not at the beginning of a new vector at step 232, the method proceeds to step 238. At step 238, the distance is calculated as the sum of the previous distance accumulator (which is 0 in the case of a new vector) and the latest change in distance. At step 240, the subroutine returns to the main routine.

Figure 11:
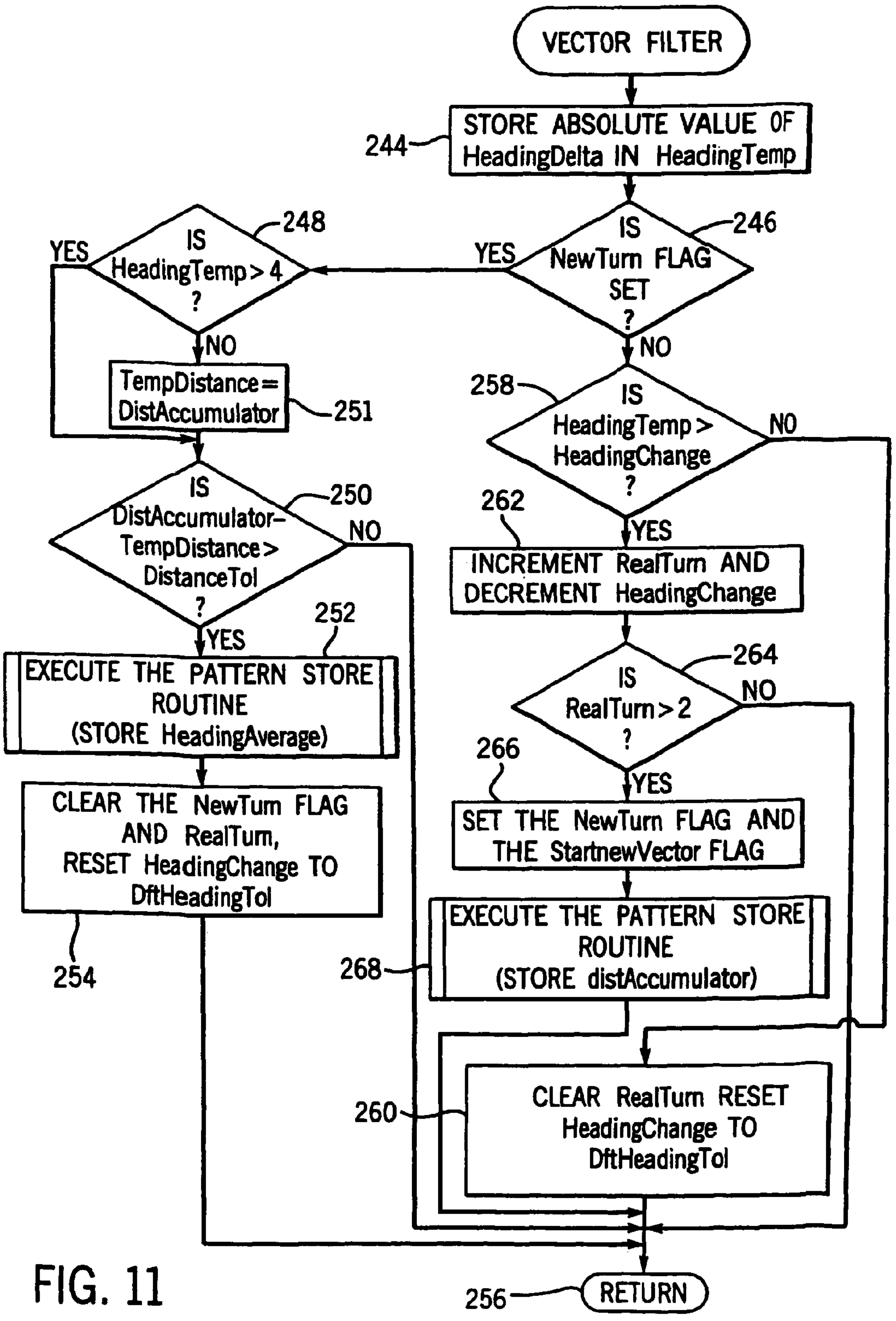
FIG. 11 is a flowchart of a "Vector Filter" subroutine of the method of FIG. 7, according to an exemplary embodiment.

Referring again to FIG. 7, after the "Calculate Distance" subroutine at step 230, the main routine calls the "Vector Filter" subroutine at step 242. Referring to FIG. 11, at step 244, the absolute value of the change in heading is stored. If a new turn is detected at step 246, if the change in heading is greater than four units at step 248, the method proceeds to step 250. If the change in heading is not greater than four units, then the distance accumulator is saved as a temporary distance at step 251. At step 250, if the distance accumulator minus the temporary distance is greater than a predetermined distance tolerance, a pattern is stored at a pattern store routine 252 and the heading average is stored, the new turn flag and real turn flags are cleared, and the heading change is reset to a default heading tolerance at step 254. The method then returns at step 256 to the main routine.

Returning to step 246, if a new turn is not detected, the method proceeds to step 258 to determine if the recent change in heading is greater than a predetermined heading change. If not, a real turn flag is cleared and a heading change is reset to a default heading tolerance at step 260, and the method returns at step 256.

If the recent change in heading is greater than the predetermined heading change at step 258, a real turn accumulator is incremented and a heading change accumulator is decremented at step 262. At step 264, if the real turn accumulator is greater than two, a new turn flag is set and a start new vector flag is set at step 266. Subsequently, at step 268, the driving pattern of the vehicle is stored and the distance accumulator is stored, and the method returns to the main routine at step 256.

At step 264, if the real turn accumulator is not greater than two, the method returns to the main subroutine at step 256.

Figure 10:
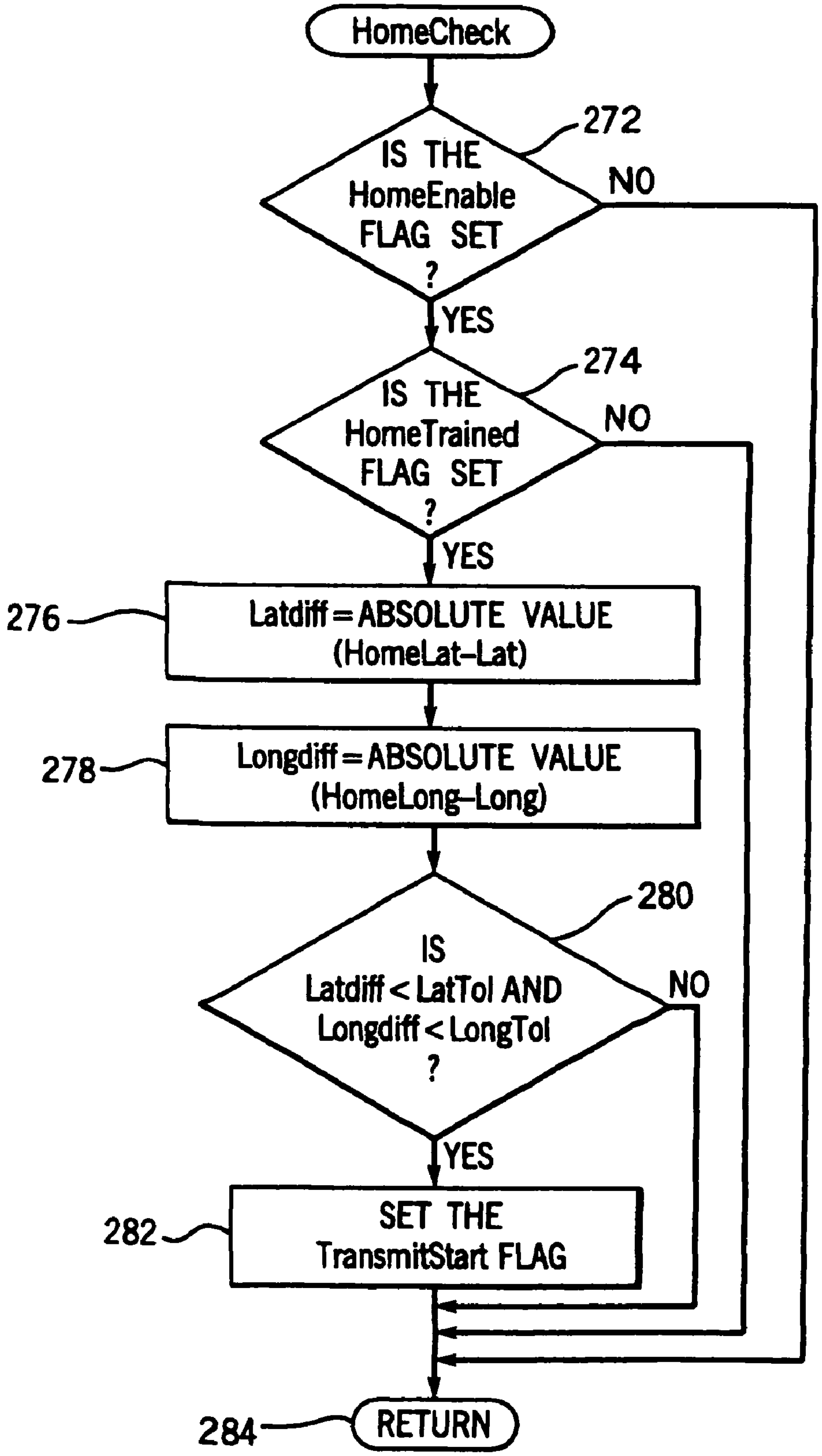
FIG. 10 is a flowchart of a "Home Check" subroutine of the method of FIG. 7, according to an exemplary embodiment.

Referring again, to FIG. 7, after the "Vector Filter" subroutine is executed in step 242, a "Home Check" subroutine is executed at step 270. Referring to FIG. 10, at step 272, if the system is configured for automatic transmission, the method proceeds to step 274 to see if the proximity of the system to the remote electronic system has been programmed. If so, the method proceeds to calculate the distance in latitude (step 276) and longitude (step 270) between the wireless control system and the remote electronic system. At step 280, if the systems are within a predetermined proximity, the "Transmit Start" flag is set at step 282 and the subroutine returns at step 284.

Figure 7:
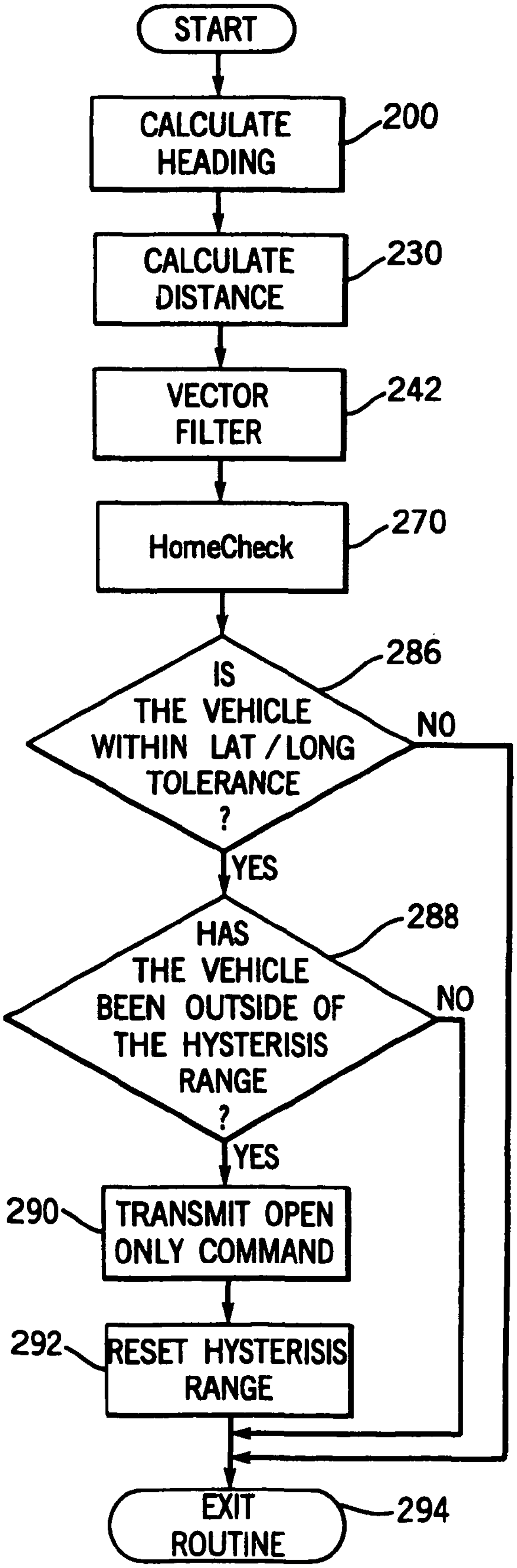
FIG. 7 is a flowchart of a method of wireless control of remote electronic systems based on location, according to an exemplary embodiment.

Referring to FIG. 7, if the vehicle is within the predetermined proximity of the home in step 286, the method proceeds to step 288 to determine whether the vehicle has been outside of a hysteresis range. If so, the "Open Only" command is transmitted at step 290 and the hysteresis range is reset at step 292. At step 294, the main routine is exited.

As can be seen, in the "Calculate Heading" subroutine of FIG. 9, the heading data is averaged using a weighted, running average. The current heading is compared to the heading average, and if the car has been traveling straight for some distance, there will be little difference between them. If, however, the car is in the process of turning, there will be a significant difference, and if the difference is past a predetermined threshold, then a new turn is considered to be taking place. Once the current heading matched the "Heading Average", then the Heading Average is stored as the heading for the new vector, and the distance accumulator is reset to 0. The distance accumulator continues to increment from this point until a new turn has taken place. As soon as this new turn is detected, the value of the distance accumulator is stored as the distance value for the vector. Because this is how the vectors are stored, the heading data gets stored before the distance data. After each vector is stored, it can be compared to the pattern to see if it is one of the vectors leading to the residence. In other set of routines would control the comparison process.

| Functions | |
|---|---|
| void VectorFilter(void); | |
| // This routine filters the heading and distance information and determines when to store each into the vector | |
| void Calculate_Heading(void); | |
| // Handles the heading average and controls how the current heading is added or subtracted from the average | |
| void Calculate_Distance(void); | |
| //Handles the Distance accumulator. Speed data is added every time data is taken when a new vector is started. This gets stored as the distance | |
| void Transmit(void); | |
| //Controls the 5 second Homelink Transmission | (Not Flowcharted) |
| void ButtonCheck(void); | (Not Flowcharted) |
| // Polls the button and checks for a press | |
| void HomeCheck(void); | |
| // Checks to see if the we are at home yet | |

| Variables | |
|---|---|
| U16 Newturn :1; | // This flag is set when a valid turn is detected and is cleared when the turn has stabilized |
| U16 StartnewVector :1; | // Set when a valid turn is detected and the distanceAccumulator is cleared out. If this flag is set, it is then cleared |
| U16 FirstPoint | :1; // If this flag is set then its the first angle that is stored, and the current data gets stored as the HeadingAverage |
| U08 Heading | ; //The Heading data for the current Vector |
| U16 Distance | ; //The Distance data for the current Vector |
| U08 DistanceTol; | //The Distance value used to ensure a valid turn has been completed |
| U08 DftHeadingTol; // The initial heading tolerance used before filtering | |
| U08 DftHeadingChange; | |
| U08 HeadingChange; | //The Angle value used to determine that a turn has taken place |
| U08 HeadingByte =0; | // Current 1/8th second Heading data |
| U08 HeadingAverage =0; | // Current running average of the heading |
| U08 HeadingDelta =0; | //The difference taken by subtracting the HeadingAverage from the HeadingByte |

-continued

| Variables | |
|---|---|
| U32 DistAccumulator; | //Contains the summation of the speed every 1/8th second for the current vector |
| U16 DistanceVar; | // Current 1/8th second speed |
| U08 RealTurn; | // Checks to see if an actual turn has occurred. Is incremented upon consecutive samples of the HeadingByte that are significantly different from the HeadingAverage. |
| int PatternNum =0; | // Controls which Pattern is currently being used |
| int VectorNum =0; | // Controls which Vector is currently being used |
| U16 TempDistance; | //This contains the distance driven, after making a valid turn, before the data is stable. This is compared to a constant, and when it is greater than the constant, the Heading information will be stored for that vector and a new vector will begin |
| int TransmitCount = 0; | // Flags to control wireless control system to ensure that it only transmits for 5 seconds |
| int TransmitStart = 0; | |
| float Lat; | //1/8th second Latitude data |
| float Long; | //1/8th second Longitude data |
| float HomeLat =0; | // Latitude in the driveway of the residence where the system will be used |
| float HomeLong =0; | // Longitude in the driveway of the residence where the system will be used |
| int HomeTrained = 0; | // Flag indicating whether the system has been trained to a specific Lat/Long yet |
| int HomeEnable = 0; | // Once this flag is set, then the product is free to transmit when its within tolerance of the Home Lat/Long |
| float LatTol; | // The tolerance that controls how far away from the Home Lat/Long the system will transmit |
| float LongTol; | // The tolerance that controls how far away from the Home Lat/Long the system will transmit |
| double Latdiff; | // Contains the absolute value of the difference between the Home Lat and the current Lat |
| double Longdiff; | // Contains the absolute value of the difference between the Home Long and the current Long |

According to one exemplary embodiment, system 12 is configured for automatic transmission of wireless control signals as described in any one of the exemplary embodiments hereinabove, and is further configured to command transceiver circuit 54 to transmit the wireless control signal in response to actuation of one of switches 34. Thus, the vehicle driver has the option of relying on location-based, automatic transmission and/or manual transmission of wireless control signal.

Wireless control system 12 may be preprogrammed (e.g., during manufacture, at the dealership, etc.) with sufficient control data to operate one or more of remote electronic systems 18, or system 12 may employ a learning operation, wherein system 12 is trainable by learning the carrier frequency, data code, and/or modulation scheme on a received wireless signal. In this embodiment, transceiver 54 is configured to receive a wireless signal, for example from a hand-held remote transmitter suitable for use with one or more remote electronic systems 18. Control circuit 30 is configured to identify a data code on the received wireless signal and to store the data code in memory, wherein the wireless control signal to be transmitted by system 12 in response to automatic or manual transmission includes the stored data code. An exemplary trainable transceiver is described in U.S. Pat. No. 5,699,054, the disclosure of which is incorporated herein by reference.

A further feature which may be implemented in any of the exemplary embodiments herein is a feature of sending two or more wireless control signals simultaneously or in sequence, each wireless control signal having control data for a different remote electronic system 18. For example, as a vehicle driver approaches the home, the driver may wish to open a security gate, open a garage door, turn on lights in the home, and disable a home security system, and the driver may wish to perform all these functions within a short period of time or in response to a single actuation of one of switches 34. According to one embodiment, the method of FIG. 4 includes a step wherein system 12 receives an indication from the user as to which of a plurality of wireless control signals are to be transmitted based on a single event (e.g., the location of the vehicle or based on actuation of one of switches 34). Thus, the user can select one or more wireless control signals which will automatically transmit when the vehicle is within a predetermined distance of the home (as determined by GPS signals or the predetermined heading/distance patterns).

Preferably, system 12 is configured to allow the user to select one or more wireless control signals to be transmitted automatically when the vehicle is in the vicinity of the house and one or more wireless control signals which are to be transmitted manually, i.e., in response to actuation of one or more of switches 34, each of the wireless control signals having different control data which will control a different remote electronic system 18. In one exemplary configuration, the user may wish to control a set of security lights and the garage door automatically, but the security date to open manually. In another configuration, the user may want the security light to be automatically turned on and the garage door to be manually operated. The training as to which of the wireless control signals are to be manually transmitted and which are to be automatically transmitted may be provided after step 62 in the method of FIG. 4, before step 68, or during a separate training operation.

According to one exemplary embodiment, the different wireless control signals will be transmitted in the order in which they were selected during training.

Figure 6:
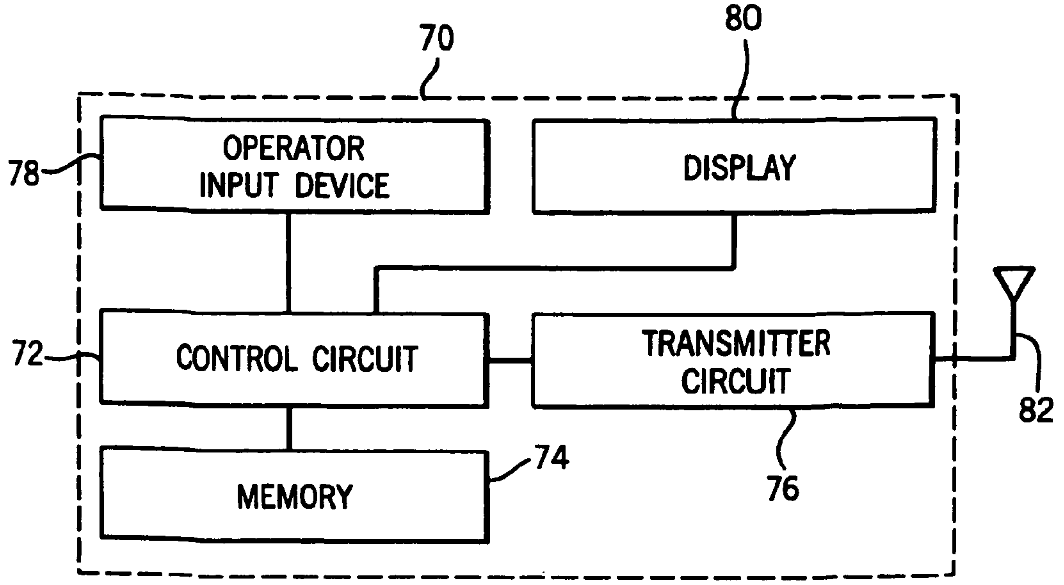
FIG. 6 is a block diagram of a transmitter for wirelessly controlling a plurality of remote electronic systems, according to an exemplary embodiment.

Referring now to FIG. 6, a transmitter or transceiver 70 for wirelessly controlling a plurality of remote electronic systems is illustrated, wherein the transmitter is configured to transmit a plurality of wireless control signals in response to a single event. Transmitter 70 includes a control circuit 72 similar to control circuit 30. Transmitter 70 further includes a memory 74, which may be a volatile or non-volatile memory, and may include read only memory (ROM), random access memory (RAM), flash memory, or other memory types. Transmitter 70 further includes a transmitter circuit 76 which may alternatively include receive circuitry, wherein transmitter circuit 76 is configured to transmit wireless control signals to one or more of remote electronic systems 18 (FIG. 2). According to an alternative embodiment, transmitter circuit 76 may include multiple transmitter circuits to enable the simultaneous transmission of multiple signals to multiple remote electronic systems 18. Transmitter 70 may be a hand-held transmitter, or may be mounted to a vehicle interior element. Transmitter 70 includes a memory 74 configured to store a plurality of control data, each control data configured to control a different remote electronic system. Transmitter 70 may further include an operator input device 78 and a display 80, which may have a similar configuration to operator input device 32 and display 36 in the embodiment of FIG. 2. The following feature of transmitting multiple wireless signals may be provided in the simplified transmitter of FIG. 6 or may alternatively be provided in system 12 in any of its various embodiments.

In operation, control circuit 72 is configured to command transmitter circuit 76 to transmit a plurality of wireless control signals over antenna 82 in response to a single event. Each wireless control signal contains a different control data message, each control data message being retrieved from memory 74. The wireless control signals may be radio frequency, infrared, or other wireless signals. The single event may be the operator actuation of operator input device 78 by a vehicle occupant. Alternatively, or in addition, control circuit 72 may be configured to receive navigation data and to determine a distance between the transmitter and the remote electronic system 18, in which case the single event can be the control circuit 72 determining that the transmitter 70 is within a predetermined distance of remote electronic system 18.

Control circuit 72 is user-programmable such that the switch in operator input device 78 causes transmitter circuit 76 to send a first wireless control signal (e.g., to turn on security lights, open a security gate, etc.) and the control circuit 72 automatically sends a second wireless control signal different than the first wireless control signal (e.g., to lift a garage door) when control circuit 72 determines that transmitter 70 is within a predetermined distance of remote electronic system 18. Further still, one switch within operator input device 78 may cause transmitter circuit 76 to send a first wireless control signal and a second switch within operator input 78 may cause transmitter 76 to send multiple control signals, wherein the multiple wireless control signals are transmitted simultaneously or in sequence.

In an exemplary embodiment wherein system 12 or transmitter 70 sends a plurality of different wireless control signals in response to actuation of one switch, one of the wireless control signals can be transmitted for a first predetermined time period (e.g., 1 to 2 seconds), then the second wireless control signals can be transmitted for a predetermined time period, (e.g., 1 to 2 seconds) and the cycle of transmissions can be repeated until the switch is released.

The features of the exemplary embodiments herein are particularly useful with garage door opener systems which can be programmed in an "up only" mode, wherein the garage door will open when a wireless control signal is received, but if the garage door is already open, the garage door will not close, but will remain open. A second mode is that in which receipt of a wireless control signal will cause a garage door opener to close if open and open if closed, and stop if in the process of closing or opening. Thus, system 12 or transmitter 70 can be configured to transmit a unique message which will place the garage door opener into the first mode, without requiring the user to manually switch the mode of the garage door opener from the second mode to the first mode.

Utilizing the feature of an "up only" mode, in an alternative embodiment of system 12, transceiver circuit 54 is configured to transmit a wireless control signal having control data which will control a garage door opener to open if the garage door is closed and to remain open if the garage door is already open when the wireless control signal is received. During training in this or any other embodiments, the location of system 12 can be recorded from GPS satellites 48 during the training operation. Thus, control circuit 30 is configured to record the location of the wireless control system 12 in response to actuation of operator input device 32.

In some situations, a garage door opener will not be configurable for "up only" operation. In these situations, an auxiliary wireless transmitter can be used. The auxiliary wireless transmitter is disposed in the vicinity of the garage door opener (e.g., coupled to the garage wall, ceiling, or a mounting bracket) and includes a housing, a receiver, a control circuit, a garage door state sensor, and an interface circuit. The garage door state sensor is configured to detect whether the garage door is open or closed. For example, a mercury switch is coupled to the garage door which changes state based on whether the switch (or door) is vertical (garage door open) or horizontal (garage door closed). The switch includes an interface circuit configured to transmit the switch state over a wired or wireless connection to the auxiliary wireless transmitter. The auxiliary wireless transmitter is configured to receive the switch state and wireless control data from system 12 indicating an "up only" command. If the garage door is closed, the auxiliary wireless transmitter will send an "open door" command via an interface circuit having a wired or wireless communication link to the garage door opener to open the garage door. The receiver, control circuit, and interface circuit are all coupled to and preferably at least partially recessed in the housing. The interface circuit is configured to provide the "open door" command from within the housing to the existing garage door opener outside the housing. If the garage door is already open, the auxiliary wireless transmitter will not send a command to the garage door opener. In this embodiment, the auxiliary wireless transmitter and garage door state sensor act as a kit which provides "up-only" functionality to an existing garage door opener.

According to an alternative exemplary embodiment wherein system 12 or transmitter 70 sends a plurality of different wireless control signals in response to actuation of one switch and transmitter 70 further includes receive circuitry, one of the wireless control signals can be transmitted for a first predetermined time period until a status or confirmation signal is received from a first remote electronic device, then the second of the wireless control signals can be transmitted until a status or confirmation signal is received from a second remote electronic device. A cycle of transmission followed by awaiting a status or confirmation signal can continue until a status or confirmation signal has been received for each remote electronic system or until a predetermined time or number failures has occurred.

While the exemplary embodiments illustrated in the FIGS. and described above are presently preferred, it should be understood that these embodiments are offered by way of example only. For example, alternative embodiments may be sutiable for use in the commercial market, wherein office lights or security systems or parking garage doors are controlled. Further, navigation data can take many forms other than GPS data, compass data, and distance traveled data. Accordingly, the present invention is not limited to a particular embodiment, but extends to various modifications that nevertheless fall within the scope of the appended claims.

What is claimed is:

1. A method for training a transmitter for a wireless control system in a vehicle to wirelessly control a plurality of remote electronic systems based upon a single event, the method comprising:

receiving a request from a user to begin training a plurality of wireless control signals to be associated with a single event;

receiving the single event;

receiving, at the in-vehicle wireless control system, a first wireless control signal having a first wireless control code;

identifying and storing the first wireless control code of the first wireless control signal;

associating the first wireless control code with the single event, whereby the in-vehicle wireless control system is configured to wirelessly control a first remote electronic system by transmitting the first wireless control code of the first wireless control signal in response to the single event;

receiving, at the in-vehicle wireless control system, a second wireless control signal having a second wireless control code;

identifying and storing the second wireless control code of the second wireless control signal; and associating the second wireless control code with the single event, whereby the in-vehicle wireless control system is configured to wirelessly control a second remote electronic system by transmitting the second wireless control code of the second wireless control signal in response to the single event;

wherein the single event is one of: (a) a single actuation of a single switch, and (b) a location-based determination; and wherein the first wireless control code and the second wireless control code are sequentially or simultaneously transmitted in response to the single event when the transmitter is operating outside of a training mode.

2. The method of claim 1, wherein storing the first wireless control code and storing the second wireless control code comprise storing in a memory device of the wireless control system.

3. The method of claim 1, wherein the request to begin training is received via a pushbutton.

4. The method of claim 1, further comprising receiving an indication from the user as to which of a plurality of wireless control signals is to be transmitted based on a location of the vehicle.

5. The method of claim 1, wherein at least one of the first wireless control code and the second wireless control code is a rolling code.

6. The method of claim 1, wherein the first wireless control code is a rolling code and the second wireless control code is a fixed code.

7. The method of claim 1, wherein the first wireless control code and the second wireless control code are fixed codes.

8. The method of claim 1, wherein the first wireless control signal is received at a first frequency and the second wireless control signal is received at a second frequency, and wherein the method further comprises storing a representation of the first frequency and a representation of the second frequency.

9. The method of claim 8, wherein the request from the user is received via a user-actuated switch coupled to the vehicle.

10. The method of claim 1, wherein receiving the single event comprises receiving a vehicle location from navigation electronics of the vehicle and storing a representation of the vehicle location in memory.

11. The method of claim 10, wherein receiving the vehicle location comprises learning a path for the vehicle to the location.

12. The method of claim 11, wherein learning the path for the vehicle to the vehicle to the location comprises recording at least two vehicle heading and distance traveled pairs that represent the path in memory.

13. The method of claim 12, wherein the at least two vehicle heading and distance traveled pairs represent at least one positive change in vehicle heading.

14. The method of claim 13, further comprising comparing a recent heading to a historical heading average to determine whether the at least one positive change in vehicle heading exists.

15. The method of claim 14, further comprising determining that the at least one positive change in vehicle heading exists when the recent heading differs from the historical heading average by a predetermined threshold.

16. The method of claim 15, further comprising counting a new distance in response to the determination that the at least one positive change in vehicle heading has occurred.

17. The method of claim 10, wherein the navigation electronics comprise a GPS receiver.

18. The method of claim 10, wherein the navigation electronics comprise a compass and a distance sensor.

19. The method of claim 18, wherein the navigation electronics do not include a GPS receiver.

20. The method of claim 19, wherein the vehicle interior element is a mirror.

21. The method of claim 1, wherein the wireless control system is coupled to a vehicle interior element.

22. The method of claim 1, wherein the vehicle interior element is at least one of an overhead console, a visor, a mirror, and an instrument panel.

* * * * *